(12) United States Patent
Articola

(10) Patent No.: US 12,054,094 B2
(45) Date of Patent: Aug. 6, 2024

(54) EARLY WARNING OF BRAKING SYSTEM AND METHOD

(71) Applicant: Phillip John Articola, Manassas, VA (US)

(72) Inventor: Phillip John Articola, Manassas, VA (US)

( * ) Notice: Subject to any disclaimer, the term of this patent is extended or adjusted under 35 U.S.C. 154(b) by 165 days.

(21) Appl. No.: 17/946,781

(22) Filed: Sep. 16, 2022

(65) Prior Publication Data

US 2024/0092256 A1   Mar. 21, 2024

(51) Int. Cl.
*B60Q 1/44* (2006.01)
*G01L 1/20* (2006.01)

(52) U.S. Cl.
CPC ............... *B60Q 1/444* (2013.01); *G01L 1/20* (2013.01)

(58) Field of Classification Search
CPC ................................. B60Q 1/444; G01L 1/20
USPC ......................................................... 340/479
See application file for complete search history.

(56) References Cited

U.S. PATENT DOCUMENTS

| | | | |
|---|---|---|---|
| 3,949,361 A * | 4/1976 | Replogle | B60Q 1/44 340/464 |
| 5,376,918 A | 12/1994 | Vinciguerra | |
| 5,381,135 A * | 1/1995 | Blount | B60Q 1/441 340/463 |
| 5,589,817 A | 12/1996 | Furness | |
| 5,942,972 A | 8/1999 | Kaner | |
| 6,486,774 B1 | 11/2002 | Arnold, Sr. | |
| 6,677,855 B2 | 1/2004 | Engleman | |
| 6,693,525 B1 | 2/2004 | McIlvain | |
| 7,154,387 B2 | 12/2006 | Boomershine, III | |
| 7,541,918 B1 | 6/2009 | Rizzi | |
| 7,710,254 B1 | 5/2010 | Hill, III | |
| 8,482,397 B1 | 7/2013 | Tajiri | |
| 8,847,748 B2 | 9/2014 | Park | |
| 10,576,887 B2 | 3/2020 | Walf-Monheim | |
| 2003/0038715 A1 | 2/2003 | Engelman | |
| 2016/0027337 A1 * | 1/2016 | Murphy | B60R 16/0232 340/457 |
| 2017/0096105 A1 | 4/2017 | Israelsson | |
| 2021/0009031 A1 * | 1/2021 | Azores | B60Q 1/44 |
| 2022/0169249 A1 | 6/2022 | Gaughan | |

* cited by examiner

*Primary Examiner* — Omar Casillashernandez

(57) ABSTRACT

A vehicle early warning braking indication system includes a sensor pad disposed beneath a brake pedal of the vehicle on a floor portion of a driver's side area of a cabin of the vehicle, the sensor pad configured to output a signal at a first voltage level when a weight greater than a predetermined weight is applied to the sensor pad. The system also includes a brake light activation unit configured to receive the signal output from the sensor pad and to cause a brake light provided on a rear portion of the vehicle to be illuminated when the signal is at the first voltage level, and to cause the brake light to not be illuminated when the signal is at a second voltage level different than the first voltage level.

20 Claims, 4 Drawing Sheets

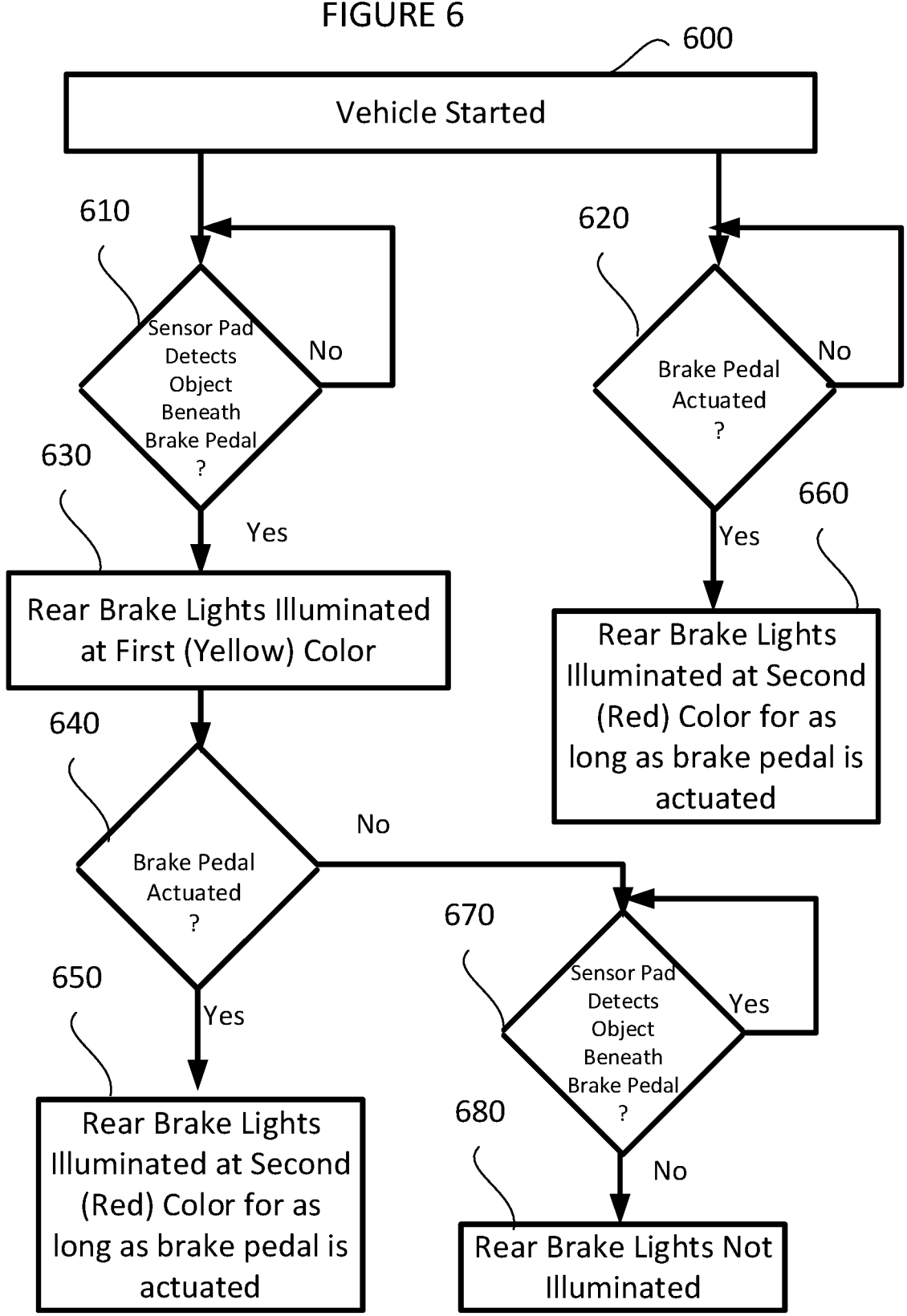

EARLY WARNING OF BRAKING SYSTEM AND METHOD

BACKGROUND

Field

This invention is directed to an early warning brake indication system for a vehicle.

Background

Conventional early warning of braking systems provide for a sensor that is attached in some manner to an acceleration pedal, whereby when a driver's foot is released from the acceleration pedal, that results in an early warning indication to be made of an upcoming braking of the vehicle.

However, it may well be the case that the driver is merely lifting his or her foot off the acceleration pedal in order to coast or to slow down the vehicle from being accelerated, or just to readjust his/her foot from a cramp that the driver is currently experiencing, whereby the driver has no intention to brake the vehicle. This action may lead to an inadvertent activation of a brake light on the rear portion of the vehicle for a conventional early warning brake indication system, such as activation of a brake indication light on the driver's side rear and the passenger's side rear of the vehicle. This activation may then mislead a vehicle behind the driver's vehicle into thinking that the vehicle in front of them is going to be braked, when in fact it is not going to be braked. The driver of that following vehicle may then slam on his/her brakes, thereby resulting a collision with a vehicle that is behind the following vehicle not being able to stop in time, when such a slamming of the brakes need not have been done since the lead vehicle was not going to be braked in that circumstance.

The above information disclosed in this Background section is only for understanding of the background of the inventive concepts, and, therefore, it may contain information that does not constitute prior art.

SUMMARY

An early warning system constructed in accordance with this one or more aspects of the invention includes one or more of the following modules:
1. A sensor that outputs a signal when a driver's foot is placed beneath a brake pedal of the vehicle.
2. A brake light control unit, which causes a brake light to be activated when the sensor generates the signal indicative of the driver's foot being beneath the brake pedal and likely to press the brake pedal with his/her foot in the very near future.

According to one aspect, there is provided a vehicle early warning braking indication system, which includes a sensor pad disposed beneath a brake pedal of the vehicle on a floor portion of a driver's side area of a cabin of the vehicle, the sensor pad configured to output a signal at a first voltage level when a weight greater than a predetermined weight is applied to the sensor pad. The vehicle early warning braking indication system also includes a brake warning system configured to receive the signal output from the sensor pad and to cause a brake light provided on a rear portion of the vehicle to be illuminated when the signal is at the first voltage level, and to cause the brake light to not be illuminated when the signal is at a second voltage level different than the first voltage level.

According to another aspect, there is provided method of providing an early warning indication of a vehicle braking state. The method includes receiving, by a brake light control unit of the vehicle, from a sensor pad disposed beneath a brake pedal of the vehicle on a floor portion of a driver's side area of a cabin of the vehicle, a signal at a first voltage level when a weight greater than a predetermined weight is applied to the sensor pad. The method also includes causing, by the brake light control unit upon receiving the signal at the first voltage level, a brake light provided on a rear portion of the vehicle to be illuminated. The method further includes causing, by the brake light control unit upon receiving the signal at a second voltage level different from the first voltage level, the brake light provided on a rear portion of the vehicle to not be illuminated.

It is to be understood that both the foregoing general description and the following detailed description are illustrative and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the inventive concepts.

FIG. 6 is a flow chart illustrating steps performed in a vehicle early warning brake indication method according to an embodiment.

DETAILED DESCRIPTION

Figure 1A:
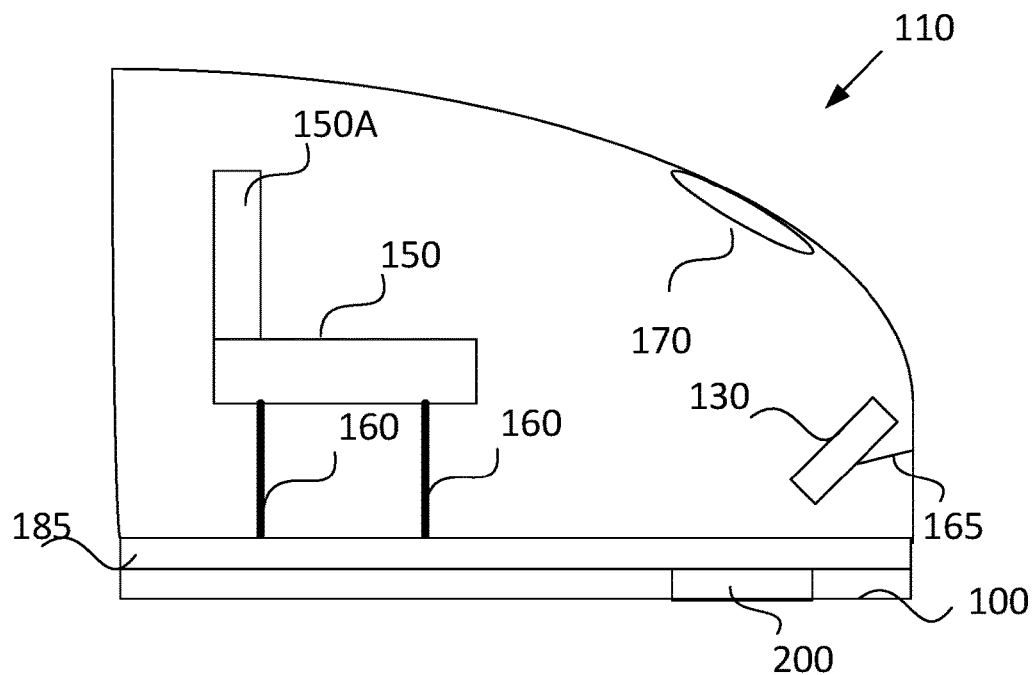
FIG. 1A illustrates a side view of a vehicle cabin of elements of a vehicle early warning brake indication system according to an embodiment.

In the following description, for the purposes of explanation, numerous specific details are set forth in order to provide a thorough understanding of various embodiments or implementations of the invention. As used herein "embodiments" and "implementations" are interchangeable words that are non-limiting examples of devices or methods employing one or more of the inventive concepts disclosed herein. It is apparent, however, that various embodiments may be practiced without these specific details or with one or more equivalent arrangements. In other instances, well-known structures and devices are shown in block diagram form in order to avoid unnecessarily obscuring various embodiments. Further, various embodiments may be different, but do not have to be exclusive. For example, specific shapes, configurations, and characteristics of an embodiment may be used or implemented in another embodiment without departing from the inventive concepts.

Unless otherwise specified, the illustrated embodiments are to be understood as providing illustrative features of varying detail of some ways in which the inventive concepts may be implemented in practice. Therefore, unless otherwise specified, the features, components, modules, layers, films, panels, regions, and/or aspects, etc. (hereinafter individually or collectively referred to as "elements"), of the various embodiments may be otherwise combined, separated, interchanged, and/or rearranged without departing from the inventive concepts.

In the accompanying drawings, the size and relative sizes of elements may be exaggerated for clarity and/or descriptive purposes. When an embodiment may be implemented differently, a specific process order may be performed differently from the described order. For example, two consecutively described processes may be performed substantially at the same time or performed in an order opposite to the described order. Also, like reference numerals denote like elements.

When an element, such as a layer, is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. To this end, the term "connected" may refer to physical, electrical, and/or fluid connection, with or without intervening elements. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. As used herein, the term "and/or" includes any and all combinations of one or more of the associated listed items.

Although the terms "first," "second," etc. may be used herein to describe various types of elements, these elements should not be limited by these terms. These terms are used to distinguish one element from another element. Thus, a first element discussed below could be termed a second element without departing from the teachings of the disclosure.

Spatially relative terms, such as "beneath," "below," "under," "lower," "above," "upper," "over," "higher," "side" (e.g., as in "sidewall"), and the like, may be used herein for descriptive purposes, and, thereby, to describe one elements relationship to another element(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the illustrative term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof. It is also noted that, as used herein, the terms "substantially," "about," and other similar terms, are used as terms of approximation and not as terms of degree, and, as such, are utilized to account for inherent deviations in measured, calculated, and/or provided values that would be recognized by one of ordinary skill in the art.

Various embodiments are described herein with reference to schematic illustrations of idealized embodiments and/or intermediate structures. As such, variations from the shapes of the illustrations as a result, for example, of manufacturing techniques and/or tolerances, are to be expected. Thus, embodiments disclosed herein should not necessarily be construed as limited to the particular illustrated shapes of regions, but are to include deviations in shapes that result from, for instance, manufacturing. In this manner, regions illustrated in the drawings may be schematic in nature and the shapes of these regions may not reflect actual shapes of regions of a device and, as such, are not necessarily intended to be limiting.

Unless otherwise defined, all terms (including technical and scientific terms) used herein have the same connotation as commonly understood by one of ordinary skill in the art to which this disclosure is a part. Terms, such as those defined in commonly used dictionaries, should be interpreted as having a connotation that is consistent with how they are to be interpreted in the context of the relevant art and should not be interpreted in an idealized or overly formal sense, unless expressly so defined herein.

Various embodiments are described in detail hereinbelow, with reference to the drawings.

Figure 1B:
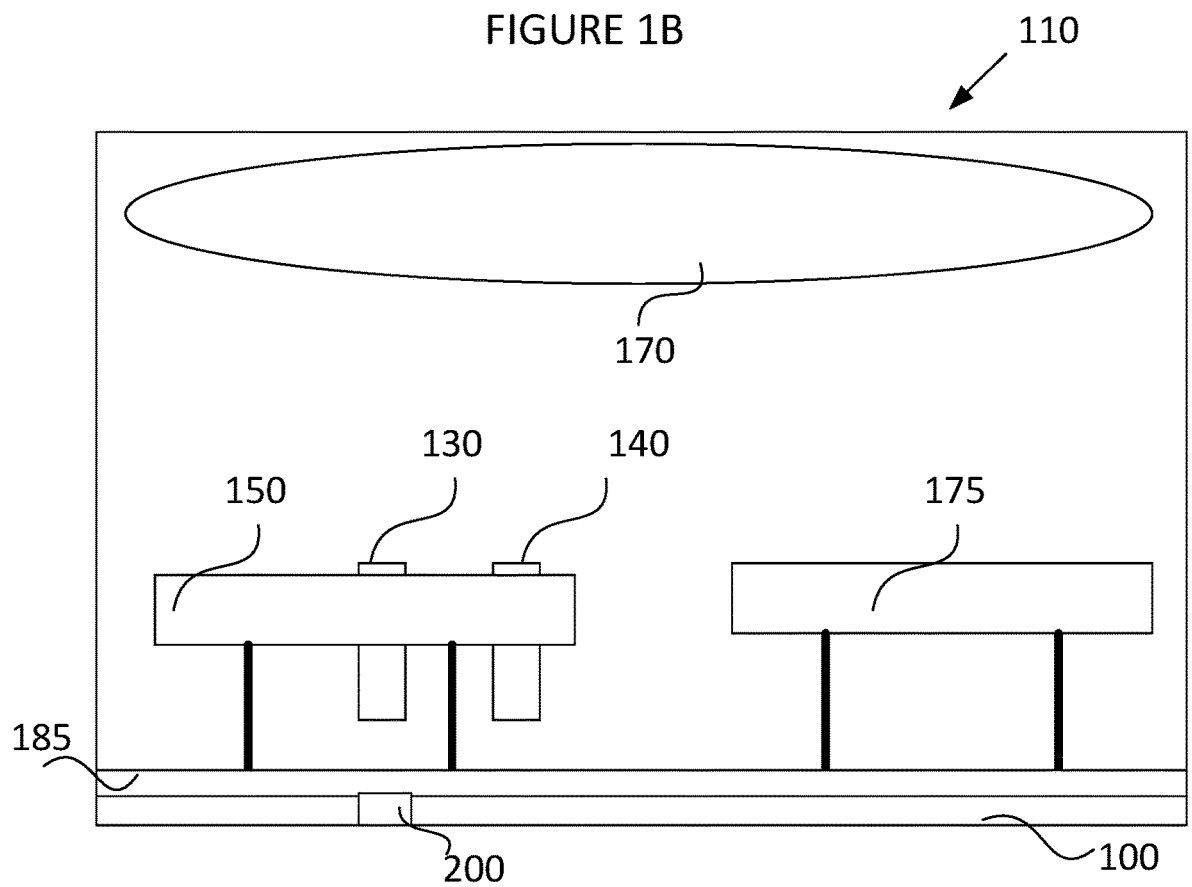
FIG. 1B illustrates a forward facing view from the rear of a vehicle cabin, of elements of a vehicle early warning brake indication system according to an embodiment.
Figure 2:
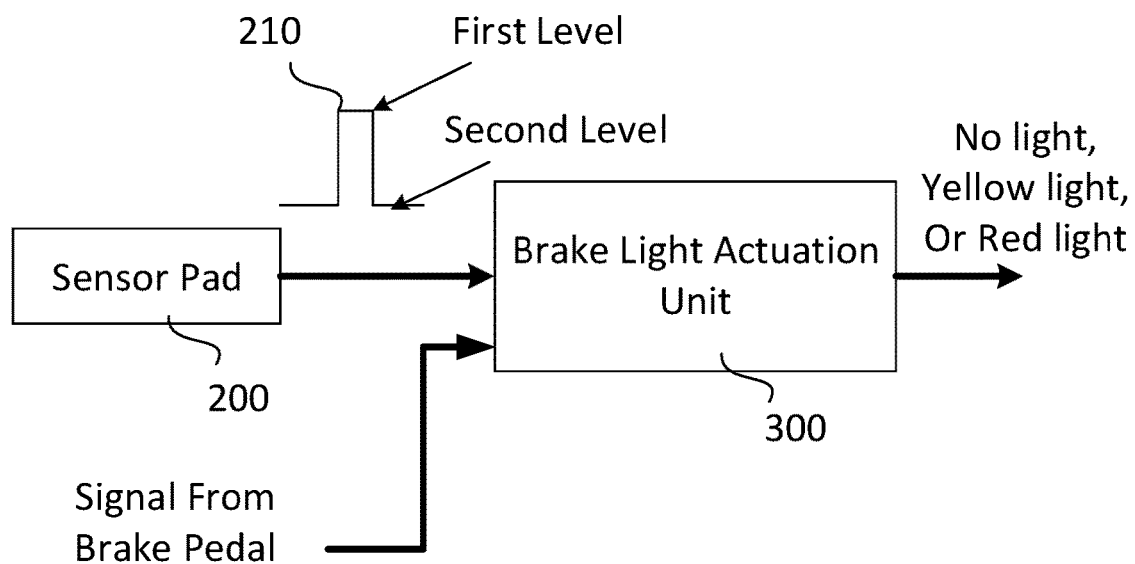
FIG. 2 illustrates in block diagram form elements making up a vehicle early warning brake indication system according to an embodiment.

FIGS. 1A and 1B illustrate elements of a vehicle early warning brake indication system suitable for use in conjunction with a first embodiment of the invention, in a side view of a vehicle cabin 110 and a forward-facing view from the rear of the vehicle cabin 110 (the rear corresponding to the left side of the vehicle cabin 110 of FIG. 1A), respectively. A floor portion 100 of the vehicle cabin 110 includes an area directly beneath a brake pedal 130 and an area directly beneath an acceleration pedal 140 of the vehicle. A weight sensor pad 200, as shown also in block diagram form in FIG. 2, is provided in an area beneath the brake pedal 130 on the floor portion 100, in which when a driver's foot rests somewhere on the floor portion 100 of the vehicle cabin 110 in an area above the weight sensor 200 so as to exceed a predetermined weight value, such as 10 foot pounds or more, the weight sensor pad 200 may output a signal at a first voltage level (e.g., 1 to 2 volts) to indicate that a driver may actuate the brake pedal 130 very soon. Upon output of the signal at the first voltage level, a brake light actuation unit 300 (also referred to herein as "brake light control unit"), as shown in block diagram form in FIG. 3, causes rear brake lights of the vehicle to turn ON, to thereby warn a driver of another vehicle behind this vehicle of an upcoming braking of the vehicle. This 'early warning of braking' lessens the chance of the other vehicle colliding with the vehicle in front of the other vehicle, such as when the other vehicle is tail-gaiting the vehicle, and/or is distracted by texting while driving, and thus that driver has only a very short amount of time to actuate the brakes on his/her vehicle and not cause a collision with the vehicle in front of his/her vehicle.

For ease in showing the elements of the vehicle early warning brake indication system in FIGS. 1A and 1B, the backrest portion 150A of the driver's seat 150 is omitted in FIG. 1B and so as not to obfuscate various elements of the vehicle early warning brake indication system, whereby the backrest portion 150A is shown in FIG. 1A for sake of completeness. Also, for sake of completeness, a windshield 170 provided on the vehicle cabin 110 is also shown in FIGS. 1A and 1B. Further, for sake of completeness, a passenger seat 175 is shown in the view from the rear of the vehicle cabin 110 in FIG. 1B. Both the driver's seat 150 and the passenger seat 175 are shown as rigidly attached to the vehicle cabin 110 by way of metal rods 160, in a manner known to those skilled in the art. Additionally, an attachment mechanism 165 as in known to those skilled in the art is shown in FIG. 1A, for attaching the brake pedal 130 to a front portion of the vehicle cabin 110 and to enable the brake pedal 130 to be actuated by a driver of the vehicle to brake the vehicle when needed. As FIG. 1B is a forward-facing view from the rear of the vehicle cabin 110, the seat portion 150 of the driver's seat blocks a portion of the brake pedal 130 and the acceleration pedal 140 from being viewed from that direction, and thus only a top portion and a bottom portion of the brake pedal 130 and the acceleration pedal 140 are shown in FIG. 1B, with a middle portion of those pedals blocked from view due to the seat portion 150 being in the way.

In the first embodiment, the sensor pad 200 outputs a signal when the sensor pad 200 detects a driver's foot somewhere on the sensor pad 200, and does not output a signal at other times when the vehicle is running. When the brake light actuation unit 300 as shown in FIG. 2 does not receive a signal output from the sensor pad 200, the brake light actuation unit 300 may not cause the rear brake lights of the vehicle to be illuminated, whereby another signal provided by the brake pedal 130 being actuated by the driver's foot may cause the brake light actuation unit 300 to be illuminated.

Figure 3:
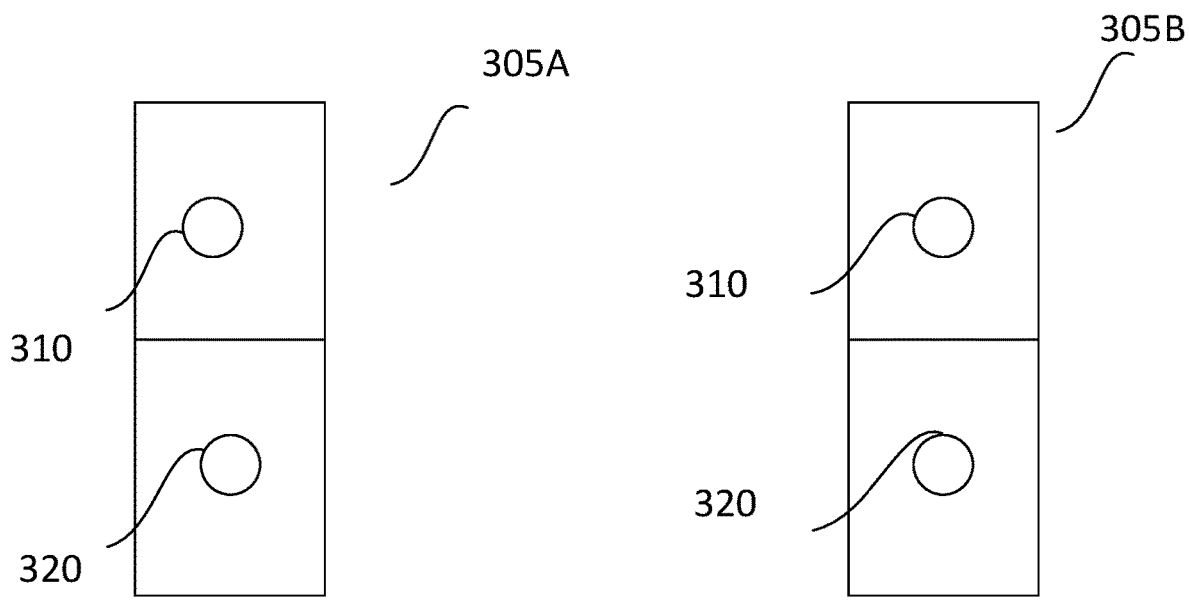
FIG. 3 illustrates rear brake lamps operable with a vehicle early warning brake indication system according to an embodiment.

In a second embodiment, the sensor pad 200 outputs a signal at a first voltage level, such as a level between 1 and 2 volts, when the sensor pad 200 detects a driver's foot somewhere on the sensor pad 200, and the sensor pad 200 outputs a second signal at a second voltage level, such as 0 volts or 0.5 volts (e.g., some value less than the first voltage level), at other times when the vehicle is running. When the brake light actuation unit 300 as shown in FIG. 3 receives a signal output from the sensor pad 200 at the first voltage level, the brake light actuation unit 300 causes the rear brake lights of the vehicle to be illuminated, whereby the brake light actuation unit 300 does not cause the rear brake lights of the vehicle to be illuminated when it receives the signal from the sensor pad 200 at the second voltage level. In either the first or second embodiments, a default state of the sensor pad 130 is to not output a signal or to output a signal at the second voltage level, and so only when a driver's foot is detected by the sensor pad 200 are rear brake lights of the vehicle caused to be activated due to that detection. Of course, when the brake pedal 130 is detected to be actuated in a manner known to those skilled in the art, the rear brake lights of the vehicle are caused to be activated irrespective as to whether or not the sensor pad 200 outputs the signal at the first voltage level.

In a third embodiment, with reference to FIG. 2, when the sensor pad 200 outputs a signal 210 at a first voltage level and at the same time the brake pedal 130 does not output a signal indicative of it being actuated, the brake light actuation unit 300 causes the rear brake lights of the vehicle to be illuminated with a first color, such as yellow, to thereby warn the operator of the vehicle behind this vehicle that a braking condition may soon occur. When the brake pedal 130 outputs a signal indicative of it being actuated, irrespective as to whether or not the sensor pad 200 outputs a signal at the first voltage level, the brake light actuation unit 300 causes the rear brake lights of the vehicle to be illuminated with a second color, such as red, which is different than the first color, to thereby provide a stronger warning to the operator of the vehicle behind this vehicle that a braking condition is occurring.

The sensor pad 200 may be constructed in any of a number of ways known in the weight detection arts to detect a weight applied to the sensor pad 200 being above some predetermined value, such as a value greater than 6 pounds per square inch. By way of example, a sensor pad may be constructed by taping two squares of Velostat™ together on both sides with Kapton™ tape, and then use strips of conductive (e.g., copper) tape applied to the two squares at even intervals. A wire may then be soldered to either side of the sensor pad. When the resistance as measured by a multimeter or other type of suitable device measures a drop in resistance of the sensor pad, such as a drop from 20 ohms (i.e., its steady state condition with no contact being made to the sensor pad) to a lower value such as 5 ohms, this is indicative of the sensor pad 200 being contacted by an object, such as a foot of a person driving a vehicle.

Application of such a sensor pad 200 to be used for a vehicle early warning brake indication system to detect placement of a driver's foot directly beneath the brake pedal 130 results in an output of an early brake warning that is more indicative as to whether the vehicle is actually about to be braked, as compared to conventional early warning brake indication systems that merely detect that the acceleration pedal is no longer being contacted by the driver of the vehicle. For example, in a case where the driver of the vehicle is stretching his/her legs when his/her foot was on the acceleration pedal, this may cause the conventional early warning brake indication system to output an incorrect indication that the driver will soon be braking the vehicle, when in fact the driver is merely stretching his/her legs and will continue to operate the acceleration pedal right after finishing his/her leg stretch. Or in a case where the driver wants his/her vehicle to coast for a short period of time, the driver who then releases his/her foot off the acceleration pedal for that short period of time may cause the conventional early warning brake indication system to output an incorrect indication that the driver will soon be braking the vehicle, when in fact that is not the case at all.

The size of the area on the floor 100 of the vehicle cabin 110 in which the sensor pad 200 is disposed may be any suitable size to detect a driver's foot beneath the brake pedal 130, such as, by way of example and not by way of limitation, a rectangular area that is 3" wide×8" long (other sizes may be envisioned while remaining within the spirit and scope of the embodiments, such as a width of from 2 to 3½" and a length of from 6 to 10"). The width of the sensor pad 200 may be seen in FIG. 1A and the length of the sensor pad 200 may be seen in FIG. 1B. In the first and second embodiments, as seen in FIGS. 1A and 1B, the sensor pad 200 may be provided beneath a plastic or fabric floor mat 185 provided on the floor portion 100 of the vehicle cabin 110 in a relatively straightforward configuration, whereby the sensor pad 200 may not be affixed to the floor portion 100 of the vehicle. The sensor pad 130 may be directly wired to the brake activation unit 300 of the vehicle in some implementations. The sensor pad 200 may output a signal wirelessly that is picked up by the brake activation unit 300 in other implementations that do not require any wiring changes to the braking system of the vehicle. As seen in FIG. 1B, the sensor pad 130 is not disposed directly beneath the acceleration pedal 140, so that way the sensor pad 200 does not provide a false indication of a driver upcoming braking the vehicle when the driver's foot is still beneath the acceleration pedal 140.

Figure 4:
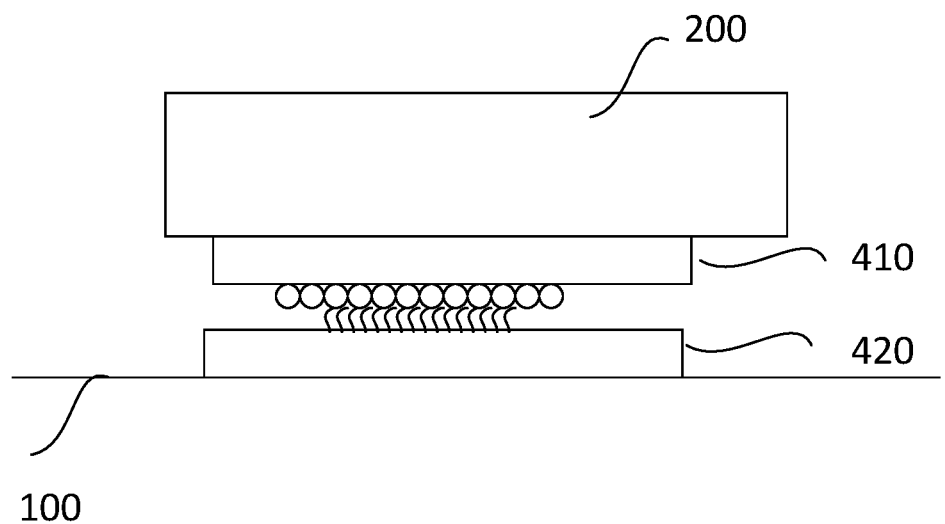
FIG. 4 illustrates a removably attachable sensor pad that may be used as part of a vehicle early warning brake indication system according to an embodiment.

The sensor pad 200 may be securely fitted underneath an upper surface of the floor portion 100 of the vehicle cabin 110 of vehicle directly beneath the brake pedal 130, so that it may stay in one position and not move from that position, which might otherwise occur if the sensor pad 200 is just placed between the upper surface of the floor portion 100 and a plastic or fabric floor mat placed over an upper surface of the floor portion 100. Such secure fitting may be way of sewing of the sensor pad 200 in place beneath an upper surface of the floor portion 100 of the vehicle cabin 110 directly beneath the brake pedal 130, or by screwing it in place or securely gluing it in place (e.g., using SuperGlue™ or some equivalent) beneath the upper surface of the floor portion 100 of the vehicle cabin 110 at a position directly beneath the brake pedal 130, or by using Velcro strips, such as shown in FIG. 4, with one Velcro strip (e.g., a male strip) 410 having a sticky side (e.g., glue provided thereon) attached to a bottom portion of sensor pad 200, and with another Velcro strip (e.g., a female strip) 420 having a sticky side (e.g., glue provided thereon) attached to an upper surface of the floor portion 100 of the vehicle cabin 110). Little circles representing a male Velcro strip and squiggly lines representing a female Velcro strip are shown in FIG. 4 to show the sensor pad 200 may be removably affixed to the floor portion 110 of the vehicle cabin 110 according to one possible implementation of the third embodiment.

In a fourth embodiment, which is a simpler implementation than the embodiments described above, the sensor pad 200 is not rigidly affixed to a position beneath the brake pedal 130, and is not removably attached to a position beneath the brake pedal 130. As a result, the sensor pad 200 may inadvertently shift to a position not directly beneath the brake pedal 130 and thereby cause a false indication of the driver's foot being positioned beneath the brake pedal 130 in some instances when in fact that is not the case, or it may totally miss the driver's foot being moved to a position directly beneath the brake pedal 130. As such, for an early warning brake indication system of the fourth embodiment, the driver should check the sensor pad 200 is properly positioned directly beneath the brake pedal 130 each time the driver gets into his/her vehicle to drive to a location. Similar to the first, second and third embodiments, the sensor pad 130 used in the fourth embodiment may be directly wired to the brake control unit 300 of the vehicle in some implementations, or the sensor pad 200 may output a signal wirelessly that is picked up by the brake control unit 300 in other implementations that do not require any wiring changes to the braking system of vehicle.

In one implementation of the fourth embodiment, the sensor pad 200 may be placed beneath a floor mat 185 without the use Velcro or some other removable attachment mechanism, in a proper location where a driver's foot rests when the driver seeks to actuate the brake pedal 130. In another alternative implementation of the fourth embodiment, the sensor pad 200 may be positioned directly beneath the brake pedal 130 in a proper location where a driver's foot rests when the driver seeks to actuate the brake pedal 130, with nothing covering the top portion of the sensor pad 200.

In any of the embodiments described above, in a state in which the brake pedal 140 is not being contacted, when the sensor pad 200 that had previously output a signal indicative of a foot of a vehicle driver resting on the sensor pad 200 changes to indicate that the foot of the vehicle driver is no longer resting on the sensor pad 200 (i.e., the resistance measured at the output of the sensor pad 200 increases from a low resistance such as 5 ohms to a measurably higher resistance such as 20 ohms), the sensor pad 200 may no longer output the signal at the first voltage level, and thus the early warning brake indication system may cause the rear brake lights to change to an OFF, or non-illuminated state.

FIG. 3 shows one possible implementation of rear brake lights provided on rear lamp structures 305A, 305B of a vehicle. The rear brake lights 310 are shown at a top portion of the rear lamp structures 305A, 305B, and night driving lights 320 are shown at a bottom portion of the rear lamp structures 305A, 305B, whereas these dispositions may be switched with each other in alternative implementations. Based on a signal output from the brake light actuation unit 300 (see FIG. 3) to the rear lamp structures 305A, 305B, a) the rear brake lights 310 may not be illuminated when no signal is received from the sensor pad 200 and from the brake pedal 130 at a particular moment in time, b) the rear brake lights 310 may be illuminated at a first color (e.g., yellow) when a signal is received from the sensor pad 200 and no signal is received from the brake pedal 130 at the same time, and c) the rear brake lights 310 may be illuminated at a second color (e.g., red) different from the first color when a signal is received from the sensor pad 200 at the same time a signal is received from the brake pedal 130.

For simpler rear lamp structures 305A that do not output rear braking indications of two different colors, a) the rear brake lights 310 may not be illuminated when no signal is received from the sensor pad 200 and from the brake pedal 130 at a particular moment in time, b) the rear brake lights 310 may be illuminated when a signal is received from the sensor pad 200 and no signal is received from the brake pedal 130 at the same time, and c) the rear brake lights 310 may also be illuminated when a signal is received from the sensor pad 200 at the same time a signal is received from the brake pedal 130.

Figure 5:
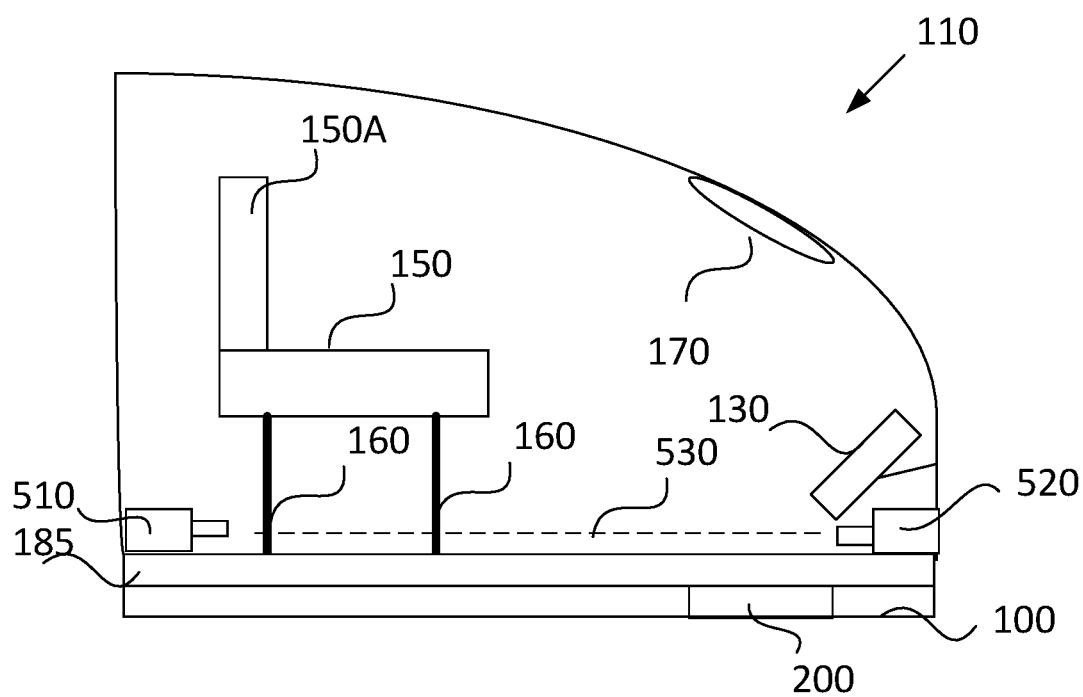
FIG. 5 illustrates a side view of a vehicle cabin of elements of a vehicle early warning brake indication system according to another embodiment.

FIG. 5 shows elements of an early brake warning indication system according to a fifth embodiment. FIG. 5 shows a system similar to what is shown in FIG. 1A, but with an addition of a light output unit 510 and a light receiving unit 520 positioned with respect to each other in a similar manner to how such units may be used in a garage door safety system to detect an object, such as a person's leg beneath a garage door that is closing on that person's leg and stopping the garage door from closing and otherwise harming that person. In particular, an object disposed between the light output unit 510 and the light receiving unit 520 blocks the light receiving unit 520 from receiving a beam of light, shown as a dashed line 530 in FIG. 5, output by the light output unit 510. The light output unit 510 and the light receiving unit 520 are positioned such that the affixing rods 160 that affix the driver's set 150 to the floor 100 of the vehicle cabin 110 do not block the beam of light 530 output by the light output unit 510 from being received by the light receiving unit 520. In one implementation of the fifth embodiment, the light output unit 510 and the light receiving unit 520 operate as a backup to the sensor pad 200, in that if the sensor pad 200 does not output a signal and thus, according to the sensor pad 200, a person's foot is not resting on the sensor pad 200, but the light receiving unit 520 outputs a signal that indicates that it is not receiving light output from the light output unit 510, the early brake warning indication system according to the fifth embodiment may cause the rear brake lights of the vehicle to be illuminated, since it may be the case that the sensor pad 200 is malfunctioning.

In another implementation of the fifth embodiment, the light output unit 510 and the light receiving unit 520 operate as a fault tolerant system operating at the same main detection level as the sensor pad 200, in that if the sensor pad 200 does not output a signal and thus, according to the sensor pad 200, a person's foot is not resting on the sensor pad 200, but the light receiving unit 520 outputs a signal that indicates that it is not receiving light output from the light output unit 510, the early brake warning indication system according to a fifth embodiment may not cause the rear brake lights of the vehicle to be illuminated, since output from both main detection systems may be required in a "fault tolerant mode" in order to cause the rear brake lights to be illuminated. As shown in FIG. 5, the light output unit 510 is affixed to a location on the floor portion 100 of the vehicle cabin 110 beneath the driver's seat 150, whereas the light receiving unit 520 is affixed to a location directly underneath the brake pedal 130 (so that the brake pedal 130 does not block the beam of light 530 output by the light output unit 510), with the affixing being made to either a location on the floor portion 100 of the vehicle cabin 110 directly beneath the brake pedal 130, or to a side portion of the vehicle cabin 110 frontwardly located with respect to the brake pedal 130 (that is, the vertically-oriented surface portion of the vehicle cabin 110 that is facing the driver).

In the fifth embodiment, a calibration mode may be performed each time the vehicle is turned on, in which if a calibration performed during the calibration mode indicates that the light receiving unit 520 is mispositioned and is not receiving light output by the light output unit 510, the vehicle operator may have to reposition either or both of the light output unit 510 and the light receiving unit 520 until the calibration mode indicates proper alignment of these elements with respect to each other. If the vehicle operator is in a hurry and does not have time to align light output unit 510 and the light receiving unit 520 with each other, in some implementations the vehicle operator can turn off the operation of the light output unit 510 and the light receiving unit 520 and just rely on the sensor pad 200 to provide an early brake warning indication. This may be accomplished by a setting on the vehicle dashboard that the vehicle operator can select this "turn off" mode by way of a user interface provided on the vehicle dashboard, for example.

FIG. 6 is a flowchart showing actions performed in an early brake warning indication method, according to an embodiment. In block 600, a vehicle start condition is detected. In block 610, a determination is made as to whether a sensor pad provided beneath a brake pedal detects an object contacting it. In block 620, which may occur at the same time block 610 occurs, a determination is made as to whether the brake pedal is being actuated. If the determination in block 610 is that no object is detected ("No" path from block 610), then in block 630, the rear brake lights are illuminated at a first (e.g., yellow) color, to provide an early 'soft' warning of a potential upcoming braking indication to vehicles behind the vehicle in question.

In block 640, a determination is made as to whether the brake pedal is being actuated. If the determination in block 640 is Yes, then in block 650, the rear brake lights are illuminated at a second (e.g., red) color different than the first color for as long as the brake pedal is actuated, to provide an indication of an actual braking of the vehicle to vehicles behind the vehicle in question (that is, a 'hard' warning).

If the determination in block 640 is No, then in block 670 a determination is made as to whether the sensor pad provided beneath the brake pedal detects an object contacting it. If the determination in block 670 is Yes, then the process returns to the beginning of block 670, with the rear brake lights continuing to be illuminated at the first color. If the determination in block 670 is No, then in block 680 the rear brake lights are no longer illuminated.

As stated above, the determination in block 620 as to whether the brake pedal is actuated is performed concurrently with the determination in block 610 as whether the sensor pad provided beneath the brake pedal detects an object on it. If the determination in block 620 is No, then the process loops back to the beginning of block 620. If the determination in block 620 is Yes, then in block 660 the rear brake lights are illuminated at the second (e.g., red) color for as long as the brake pedal is actuated.

In the embodiments described above, by detecting an object, which is likely a driver's foot, positioned beneath the brake pedal 140, prior to the driver's foot actually contacting the brake pedal 140, a rear brake light may be illuminated a few tenths of a second to one or more seconds earlier than at a time when the brake pedal 140 is actually contacted by the driver's foot, to provide an earlier indication to a driver of a vehicle behind the vehicle in question, which may provide a valuable amount of extra time for that driver to perform an evasion maneuver to avoid a collision with the vehicle in front of that driver that is about to undergo a braking operation. The evasion maneuver may be a braking of the vehicle behind the vehicle in question, or it may be a steering operation to avoid collision with the vehicle in question, or a combination of the two.

Although certain embodiments and implementations have been described herein, other embodiments and modifications will be apparent from this description. Accordingly, the inventive concepts are not limited to such embodiments, but rather to the broader scope of the appended claims and various obvious modifications and equivalent arrangements as would be apparent to a person of ordinary skill in the art.

What is claimed is:

1. A vehicle early warning braking indication system, comprising:
   a sensor pad disposed beneath a brake pedal of the vehicle on a floor portion of a driver's side area of a cabin of the vehicle, the sensor pad configured to output a signal at a first voltage level when a weight greater than a predetermined weight is applied to the sensor pad; and
   a brake light control unit configured to receive the signal output from the sensor pad and to cause a brake light provided on a rear portion of the vehicle to be illuminated when the signal is at the first voltage level, and to cause the brake light to not be illuminated when the signal is at a second voltage level different than the first voltage level,
   wherein the signal at the first voltage level causes the brake light to be illuminated even when the brake pedal is not currently being physically actuated by the driver.

2. The system according to claim 1, wherein the sensor pad outputs the signal at the second voltage level as a default condition.

3. The system according to claim 1, wherein the first voltage level is an active high voltage level greater than zero volts.

4. The system according to claim 1, wherein the second voltage level is an active low voltage level that corresponds to zero volts.

5. The system according to claim 1, wherein the sensor pad is detachably attached to an upper surface of floor portion of the driver's side area of the vehicle cabin, and wherein the sensor pad is disposed beneath an outer covering of the floor portion of the driver's side area of the vehicle cabin, and wherein the outer covering comprises a floor mat.

6. The system according to claim 1, wherein the signal at the first voltage level received by the brake light control unit that has been output by the sensor pad causes the brake light to be illuminated at a same time that brake light control unit has received an indication that the brake pedal is not currently being physically actuated by the driver.

7. The system according to claim 1, wherein the brake light control unit is configured to receive a signal from an acceleration pedal of the vehicle when the acceleration pedal is being contacted by the driver,
wherein the brake light control unit causes the brake light to be illuminated in a first color when the signal at the first level is being received and the brake pedal is not being actuated, and
wherein the brake light control unit causes the brake light to be illuminated in a second color different than the first color when the brake pedal is being actuated.

8. The system according to claim 7, wherein the first color is yellow, and wherein the second color is red.

9. A method of providing an early warning indication of a vehicle braking state, comprising:
receiving, by a brake light control unit of the vehicle, from a sensor pad disposed beneath a brake pedal of the vehicle on a floor portion of a driver's side area of a cabin of the vehicle, a signal at a first voltage level when a weight greater than a predetermined weight is applied to the sensor pad; and
causing, by the brake light control unit upon receiving the signal at the first voltage level, a brake light provided on a rear portion of the vehicle to be illuminated; and
causing, by the brake light control unit act upon receiving the signal at a second voltage level different from the first voltage level, the brake light provided on the rear portion of the vehicle to not be illuminated,
wherein the signal at the first voltage level causes the brake light to be illuminated even when the brake pedal is not currently being physically actuated by the driver.

10. The method according to claim 9, wherein the first voltage level is an active high voltage level.

11. The method according to claim 9, wherein the second voltage level is an active low voltage level corresponding to zero volts.

12. The method according to claim 9, wherein the sensor pad is detachably attached to an upper surface of the floor portion of the driver's side area of the vehicle cabin.

13. The method according to claim 12, wherein the sensor pad is disposed beneath a floor mat such that the sensor pad is disposed between the floor mat and the upper surface of the floor portion of the driver's side area of the vehicle cabin, and wherein the sensor pad is not detachably attached to the floor mat.

14. The method according to claim 9, wherein the brake warning system is configured to receive a signal from an acceleration pedal of the vehicle when the acceleration pedal is being contacted by the driver,
wherein the brake light control unit causes the brake light to be illuminated in a first color when the signal at the first voltage level is being received and the brake pedal is not being actuated, and
wherein the brake light control unit causes the brake light to be illuminated in a second color different than the first color when the brake light control unit receives an indication that the brake pedal is being actuated, and
wherein the brake light control unit causes the brake light to not be illuminated in any color when the signal at the second voltage level is being received.

15. The method according to claim 14, wherein the first color is yellow, and wherein the second color is red.

16. The method according to claim 14, wherein when the brake light control unit receives an indication that the brake pedal is not currently being actuated at a same time that the brake light control unit receives the signal at the first voltage level output by the sensor pad, the brake light control unit causes the brake light to be illuminated.

17. The system according to claim 1, further comprising:
a light output unit disposed on the floor portion of the driver's side area of the cabin of the vehicle, in which the light output unit is disposed rearward of or beneath a driver's seat of the vehicle such that the light output unit is closer to a rear of the vehicle than the brake pedal;
a light receiving unit disposed on the floor portion of the driver's side area of the cabin of the vehicle, in which the light receiving unit is disposed in front of the brake pedal of the vehicle within the cabin of the vehicle, such that the light receiving unit is closer to the front of the vehicle than the brake pedal,
wherein the light receiving unit is positioned directly opposite the light output unit within the cabin of the vehicle, such that light output from the light output unit is received by the light receiving unit when no object is between the light output unit and the light receiving unit; and
wherein the brake light control unit is configured to receive a signal output from the light receiving unit and to cause the brake light provided on the rear portion of the vehicle to be illuminated when the signal output from the light receiving unit is at a first voltage level, and to cause the brake light to not be illuminated when the signal output from the light receiving unit is at a second voltage level different than the first voltage level,
wherein the light receiving unit outputs the signal at the first voltage level when the light receiving unit receives light output by the light output unit to indicate that no object is disposed between the light output unit and the light receiving unit, and
wherein the light receiving unit outputs the signal at the second voltage level when the light receiving unit does not receive light output by the light output unit to indicate that an object is disposed between the light output unit and the light receiving unit.

18. The method according to claim 9, wherein a light output unit is disposed in a driver's side area of a cabin of the vehicle such that the light output unit is disposed rearward of or beneath a driver's seat of the vehicle such that the light output unit is closer to a rear of the vehicle than the brake pedal, and a light receiving unit is disposed in the driver's side area of the cabin of the vehicle such that the light receiving unit is disposed in front of the brake pedal such that the light receiving unit is closer to a front of the vehicle than the brake pedal, wherein the light receiving unit is positioned such that light output from the light output unit is received by the light receiving unit when no object is between the light output unit and the light receiving unit,
the method further comprising:
causing the light receiving unit to output a signal at the first voltage level when the light receiving unit does not receive light from the light output unit;
causing the light receiving unit to output a signal at the second voltage level when the light receiving unit receives light from the light output unit;
receiving, by the brake light control unit, the signal output from the light receiving unit, and to cause the brake light to be illuminated when the signal is at the first voltage level, and to cause the brake light to not be illuminated when the signal is at the second voltage level different than the first voltage level.

19. A vehicle early warning braking indication system, comprising:
a light output unit disposed in a driver's side area of a cabin of the vehicle in which the light output unit is disposed rearward of a driver's seat of the vehicle, such that the light output unit is closer to a rear of the vehicle than the brake pedal;
a light receiving unit disposed in the driver's side area of the cabin of the vehicle in which the light receiving unit is disposed in front of a brake pedal of the vehicle, such that the light receiving unit is closer to a front of the vehicle than the brake pedal,
wherein the light receiving unit is positioned directly across the light output unit in the cabin of the vehicle, such that light output from the light output unit is received by the light receiving unit when no object is between the light output unit and the light receiving unit; and
a brake light control unit configured to receive a signal output from the light receiving unit and to cause a brake light provided on a rear portion of the vehicle to be illuminated when the signal is at a first voltage level, and to cause the brake light to not be illuminated when the signal is at a second voltage level different than the first voltage level,
wherein the light receiving unit outputs the signal at the first voltage level when the light receiving unit receives light output by the light output unit to indicate that no object is disposed between the light output unit and the light receiving unit, and
wherein the light receiving unit outputs the signal at the second voltage level when the light receiving unit does not receive light output by the light output unit to indicate that an object is disposed between the light output unit and the light receiving unit.

20. The system according to claim 19, wherein the object corresponds to an ankle or foot of a driver of the vehicle.

* * * * *